3,539,358
DEHYDRATED BLAND PUDDING BASE
Francisco S. Hing, Chicago, Ill., assignor to Gerber Products Company, Fremont, Mich.
No Drawing. Filed Mar. 1, 1967, Ser. No. 619,554
Int. Cl. A23l 1/14
U.S. Cl. 99—139     8 Claims

ABSTRACT OF THE DISCLOSURE

Production of a bland pudding base reconstitutable with a flavored fluid by gelatinizing an aqueous slurry of cross-linked acylated waxy grain starch and sugar, said sugar being in a starch to sugar ratio of about 2:1 to 1:2.

---

This invention relates to a precooked, dehydrated, essentially bland pudding base suitable for rapid reconstitution with liquids such as fruit juices to produce a thickened, nutritious pudding having the flavor of the liquid and to the method for its preparation. The pudding base, when reconstituted with a fruit juice, is especially suited for use as an infant food.

Many types of reconstitutable flavored pudding bases which are to be rehydrated with milk or water are presently available to the consumer. These flavored products are usually dry blends of pregelatinized starch with substantial quantities of sugar, usually in a weight ratio of at least 5 parts sugar to 1 part pregelatinized starch. This high concentration of sugar is required to serve as a physical dispersing agent during the reconstitution of the pregelatinized starch to produce a smooth-textured, appetizing product having uniform dispersion characteristics.

To date there are no commercially available dehydrated bland (unflavored) pudding bases to which liquids, such as fruit juices, can be added at the discretion of the consumer. With such a product, the consumer would be able to prepare a reconstituted product which displays the flavor of the particular liquid as well as the thickened consistency of the pudding base without sacrificing any of the nutritional value of the liquid as a result of heating and/or dehydration. For example, if orange juice is dehydrated and made a part of the dehydrated pudding mix for reconstitution with plain water, the end product would not have the same fresh orange flavor obtainable with the present bland or neutral base when reconstituted with fresh or fresh frozen orange juice. In addition, the vitamin content of the orange juice is retained with the present product to an extent not possible when a dehydration process is applied to orange juice.

However, when a dehydrated bland pudding base, containing the conventional ratio (5:1) of sugar-to-starch, is mixed with a fruit juice, the combined sugar present in the juice and the pudding base has been found to produce a reconstituted product which is overly sweet and largely unappetizing. Attempts to enhance the taste of such a combined, reconstituted product by decreasing the sugar-to-starch ratio of the dry blended pudding base have proved unsuccessful. The reason for this is that when the amount of uncombined sugar in the preblended pudding base is appreciably decreased below the 5:1 ratio necessary for the uniform dispersion of conventional dry blended compositions, the amount of sugar remaining is insufficient to provide uniform dispersion of the pregelatinized starch during subsequent rehydration. Therefore, the resulting reconstituted pudding has been found to be lumpy and generally unattractive to the ultimate consumer.

It has now been found that when certain modified starches are gelatinized while in an aqueous slurry containing sugar in a sugar-to-starch weight ratio of up to 2:1, and thereafter dehydrated, the resulting bland pudding base has dispersion characteristics which are at least equivalent to those obtained in a conventional dry blended composition containing sugar to starch in a weight ratio of 5:1. In a preferred aspect, the invention contemplates the formation of a dehydated, bland pudding base containing substantially equal amounts of sugar and starch.

The gist of the invention lies in the technique of gelatinizing the starch content of the pudding base in the presence of the limited amount of sugar employed. The sugar-starch combination obtained from the gelatinization of starch in the presence of sugar is believed to cause a chemical reaction or combination between the two materials which promotes the uniform dispersibility and desired reconstitution properties. The precise chemical structure of this new product which may be derived by gelatinizing starch in the presence of sugar has not been ascertained and will be referred to herein as a gelatinized starch-sugar complex. The function of the sugar in the new starch-sugar complex is to be distinguished from the physical function of the high sugar concentration in prior puddings with respect to uniformity of dispersion on reconstitution. In the present situation, the new complex is believed to disperse because of the chemical nature of the starch-sugar reaction product rather than because of any physical phenomenon.

The dehydrated bland sugar/starch-containing product of this invention has been found to be easily and quickly reconstitutable with various types of liquids, and especially fruit juices, merely by hand stirring or shaking to form an attractive, uniformly dispersed, thickened consumer product which possesses the essential vitamins found in the liquid. Thus, when the bland pudding base of this invention is reconstituted with fresh fruit juice such as orange juice, it provides all the nutritional advantages of the fresh juice, yet exhibits the thickened consistency of a pudding.

The preparation of this rapidly reconstitutable bland pudding base is accomplished by first forming an aqueous slurry containing the sugar, preferably granulated white sugar, and a starch, preferably a waxy grain starch, modified as hereinafter set forth. The starch is then gelatinized by heating the slurry either during dehydration or separately. It is preferable to precook the slurry to at least partially gelatinize the starch, such as, for example, as set forth in Gerber U.S. Pat. No. 3,197,312, issued July 27, 1965. Thereafter, the gelatinization is completed while dehydrating the sugar/starch slurry on a heated drying surface such as a drum drier.

In practicing this invention it is advantageous to employ a naturally-occurring grain starch in which the amylpectin molecules of the starch have been modified by cross-linking and acylating. In particular, waxy maize (amioca) starch modified in this way has particular application to this invention. Such a starch is presently available commercially under the trademark W-13 Stabilizer from the American M ziarodPucet.ali o- cm mm Other commercially available modified grain starches have been found to be particularly suitable in the practice of this invention.

The aqueous sugar-starch formulation employed in this invention advantageously includes an effective amount of an ester-emulsifier, derived from a fatty acid or alcohol, to assist in accomplishing the release of the dehydrated slurry from the drying surface. These organic additives, hereinafter referred to as "releasing agents," and described in greater detail in copending U.S. patent application, Ser. No. 473,832, filed July 21, 1965, are included in the sugar-starch slurry. These additives assist in reducing the plasticity of the slurry sheet as subsequently formed on the drying surface. Furthermore, the use of a releasing agent negates the practical commercial problems of removing the dried slurry on a continuous basis without equipment shutdown which may be caused by adhesion of dehydrated slurry to the drying surface.

Releasing agents which have been found to be particularly effective in the process of this application for minimizing sticking to the drying surface include the phosphatides, a group of complex lipids containing a phosphoric acid grouping and a nitrogenous base, in addition to other acid components. The preferred ester of this grouping has been found to be lecithin—a mixture of the diglycerides of stearic, palmitic and oleic acids linked to the choline ester of phosphoric acid.

Various lecithin-containing compositions are commercially available and have been found to be especially advantageous.

The ester-containing releasing agents may be employed in quantities up to 5% by weight, based on the initial solids content of the slurry, but are advantageous in amounts as small as 0.01% by weight. When employed in concentrations from about 1.0 to about 3.0% by weight, these releasing agents have been found to be especially effective in assisting in the production of a dehydrated bland sugar/starch pudding base which releases easily from the drying surface.

In another aspect of the instant invention, it has been found that it is also advantageous to include certain alkalizing agents in the sugar/starch formulation, especially when the dehydrated bland pudding base will be reconstituted with a liquid having a high acidity such as a fruit juice. The amount of alkalizing agent employed should be sufficient to neutralize the acidity of the resulting reconstituted fruit juice/pudding base. In this regard, amounts up to 10% by weight of total solids have been found to be useful.

Alkalizing agents which have been found to be effective include salts of a strong base and weak acid, for example, disodium phosphate, sodium carbonate, sodium bicarbonate, sodium ascorbate, and the like. Disodium phophate in its anhydrous form is especially effective, although other forms of disodium phosphate, i.e., dihydrate and heptahydrate, are also advantageous.

In still another aspect of the invention, nonfat dry milk powder in amounts up to 25% by weight of the total solids content of the slurry may be incorporated to enhance the flavor of the reconstituted product, as well as increase the nutritional value of the composition. Various other ingredients, such as seasonings and artificial flavorings, can be included in the aqueous sugar/starch formulations in minor amounts to improve the ultimate flavor of the final reconstituted product.

The sugar-to-starch ratio can be varied from up to 2:1 to as low as 1:2 and will depend on the level of sweetness desired in the reconstituted pudding. When it is anticipated that the dehydrated bland pudding base will be reconstituted with a fruit juice, a sugar-to-starch weight ratio of about 1:1 will produce a particularly appetizing rehydrated pudding. In addition to providing the requisite level of sweetness in the rehydrated pudding, the sugar functions to provide a smooth texture in the pudding. Consequently, the amount of sugar utilized in combination with the starch should be sufficient to create a smooth texture in the reconstituted product.

The novel reconstitutable essentially bland pudding base of this invention is prepared, for example, by first forming a slurry of the modified grain starch, granulated white sugar and releasing agent. Other optional ingredients such as nonfat dry milk and an alkalizing agent can also be included. When lecithin, in some commercially available form, is employed as the releasing agent, it is advantageous to preblend the lecithin with sugar, preferably in a ratio of about 1 part lecithin to 10 parts sugar. This insures a uniform distribution of the releasing agent in the sugar.

Sufficient water is added to the dry ingredients so that the solids content of the resulting formulation will be from about 15 to 30% by weight. It will be appreciated by those skilled in this art that the solid concentration of the slurry will control the characteristics and properties of the resulting dehydrated pudding base product, as well as control the amount of water which necessarily must be removed in the drying operation.

The sugar/starch-containing slurry is then passed through a screen to produce a formulation of uniform consistency. Conventional screening devices with openings of about 0.033 inch are frequently employed. Subsequent heating of the slurry to 140 to 230° F., and preferably 180 to 205° F., in conventional equipment such as atmospheric, vacuum, pressure-cooking tanks or in-line agitating heaters, produces a gelatinized formulation suitable for dehydration.

Drying is accomplished at conventional temperatures to remove as much of the water present in the sugar/starch formulation as possible without detrimentally affecting its quality. The dehydrated bland pudding base products envisioned by this invention usually contain at least 90% solids and preferably 95 to 98% solids. The drying operation completes the cooking and gelatinization processes.

Suitable drying means include, e.g., any of the conventional equipment readily available, such as single or double drum dryers, well-known to this art. The dehydrated formulation is most easily removed from the drying surface as a continuous sheet, preferably having a thickness of 4–7 mils, and without sticking, balling or lumping with, e.g., a conventional doctor blade.

When using such drum dryers, the film thickness will obviously be dependent on the space in between the drums, the drum speed, the type of sugar/starch containing formulation being treated and the steam pressure in the drums. The steam pressure can be advantageously employed in the range of 20 to 80 p.s.i.g.

The dried sugar/starch containing sheet may be prepared for packaging and ultimate consumption by flaking into various sizes depending, of course, on the rehydration characteristics of the particular dehydrated sugar/starch pudding base being treated. The flaking can be accomplished in standard equipment such as a 10 mesh U.S. sieve series screen (0.030-inch wire). Care should be taken to avoid producing a particle size in the finished product which is too fine, as the particles may tend to lump and therefore be difficult to rehydrate.

Although the dehydrated sugar/starch formulation of this invention can be reconstituted with any conventional type of flavored liquid, including, for example, chocolate flavored milk, Hawaiian punch, and the like, the dehydrated formulation is especially adapted for reconstitution with fresh fruit juices, including concentrates and essences. Illustrative of the types of fruit which form suitable liquid additives include orange, apple, cherry, red raspberry, blackberry, plum, pineapple, strawberry, grape, black raspberry and combinations thereof such as orange-pineapple, pineapple-grapefruit, orange-apple, apple-cherry, orange-apricot, prune-orange, orange-apple-banana and the like.

To further illustrate the novel process of the invention, the following example is provided. It should be understood that the details thereof are not to be regarded as limitations as they may be varied, as will be understood by one skilled in this art.

A sugar/starch-containing slurry was prepared in approximately the following proportions:

| Ingredients: | Weight percent per total weight solids |
|---|---|
| White granulated sugar | 40 |
| W-13 Stabilizer [1] | 35 |
| Nonfat dry milk powder | 17 |
| Anhydrous disodium phosphate | 5 |
| Lecithin concentrate (Sta-Sol UF-3) [2] | 2.5 |
| Iodized salt | .5 |
| | 100 |

[1] Waxy maize starch modified by the process of U.S. Pat. 2,935,510, supra, and available from the American Maize Products Co., New York, N.Y.
[2] Available from A. E. Staley Manufacturing Co., Decatur, Ill.

The white granulated sugar and lecithin concentrate were first combined in a blender and then added to the remaining dry ingredients. Sufficient water was then added to adjust the volume to 125 gallons.

The slurry was pumped through a line strainer having a screen size of 0.033-inch to an in-line heater and heated to about 190° F. for about 20 minutes. The heated slurry was then fed to a conventional double drum dryer, each drum operating at an internal steam pressure of 40 to 50 p.s.i.g. The drums were rotated at two to three revolutions per minute and the dried sheet removed with doctor blades. The resulting sheet was continuously conveyed to a flaker employing a 0.033-inch screen.

About 23.5 grams of the flaked dehydrated bland pudding base were added to 4.2 fluid ounces of strained orange juice. Hand stirring and shaking was used to disperse the powder uniformly into the juice.

It took about 30 seconds to thicken the product and two or three minutes to set to a final pudding consistency. The texture of the reconstituted pudding was short and smooth and the flavor was as good as the original fruit juice.

Preliminary storage study of the dehydrated bland pudding base, air-packed in tin cans, indicated that the pudding base had excellent stability for a period in excess of six months at 90° F. No rancidity or other off-flavors was noted when portions of the bland pudding base were re-hydrated with various fruit juices.

Although the foregoing invention has been described in some detail by way of illustration and example for purposes of clarity in understanding, it is understood that certain changes and modifications may be practiced within the scope of the invention as limited only by the scope of the appended claims.

What is claimed is:

1. A process for preparing a precooked, dehydrated bland pudding base especially suitable for rapid reconstitution with a liquid, such as a fruit juice, to form a uniformly dispersed liquid-flavored pudding, comprising the steps of: preparing an aqueous slurry containing cross-linked, acylated waxy grain starch, and sugar, the weight ratio of sugar to starch being between about 2:1 and 1:2; heating said slurry at a temperature and for a period of time sufficient to at least partially gelatinize said starch; and thereafter dehydrating said slurry while completing the gelatinization of said starch.

2. A process in accordance with claim 1 wherein said dehydration is accomplished on a heated drying surface.

3. A process in accordance with claim 2 wherein said slurry also contains a releasing agent, said releasing agent being present in an amount sufficient to enhance the removal of said dehydrated base from said heated drying surface.

4. A process in accordance with claim 3 wherein the releasing agent is lecithin.

5. A process in accordance with claim 1 wherein said aqueous slurry also includes an alkalizing agent.

6. A process in accordance with claim 5 wherein said alkalizing agent is anhydrous disodium phosphate.

7. A process in accordance with claim 1 wherein said aqueous slurry also includes nonfat dry milk powder.

8. A process of preparing dehydrated puddings, comprising preparing an unflavored neutral pudding base by mixing cross-linked, acylated waxy grain starch with sugar in a weight ratio of sugar-to-starch of between about 2:1 and 1:2; and gelatinizing said starch in the presence of said sugar, said neutral base being especially adapted for reconstitution with a flavored liquid to form a pudding having the flavor of said liquid.

References Cited
UNITED STATES PATENTS

| | | | |
|---|---|---|---|
| 2,500,179 | 3/1950 | Hinz et al. | 99—139 |
| 2,613,150 | 10/1952 | Halden | 99—139 |
| 2,801,924 | 8/1957 | Clausi | 99—139 |
| 2,806,026 | 9/1957 | Evans | 127—32 |
| 2,935,510 | 5/1960 | Wurzburg | 99—139 |

OTHER REFERENCES

Whistler et al.: Starch, Chemistry & Technology, "Production and Use of Pregelatinized Starch," Academic Press, New York, 1967, pp. 524–527.

MAURICE W. GREENSTEIN, Primary Examiner

J. M. HUNTER, Assistant Examiner